United States Patent [19]
Ishibashi

[11] Patent Number: 5,238,458
[45] Date of Patent: Aug. 24, 1993

[54] BICYCLE SPEED CHANGE ASSEMBLY

[75] Inventor: Yasunori Ishibashi, Osaka, Japan

[73] Assignees: Maeda Industries, Ltd., Osaka; Bridgestone Cycle Co., Ltd., Tokyo, both of Japan

[21] Appl. No.: 967,862

[22] Filed: Oct. 28, 1992

[30] Foreign Application Priority Data

Nov. 11, 1991 [JP] Japan ................... 3-294668

[51] Int. Cl.⁵ ............................................. F16H 63/00
[52] U.S. Cl. .................................................. 474/82
[58] Field of Search ................................. 474/77–82

[56] References Cited

U.S. PATENT DOCUMENTS

| | | | |
|---|---|---|---|
| 4,443,208 | 4/1984 | Kozakae | 474/82 |
| 4,801,287 | 1/1989 | Romano | 474/82 |
| 4,895,553 | 1/1990 | Nagano | 474/82 X |

FOREIGN PATENT DOCUMENTS

| | | |
|---|---|---|
| 830162 | 7/1938 | France . |
| 2592931 | 7/1987 | France . |
| 9210395 | 6/1992 | PCT Int'l Appl. . |

*Primary Examiner*—Thuy M. Bui
*Attorney, Agent, or Firm*—Michael D. Bednarek

[57] ABSTRACT

The present invention provides a bicycle speed change assembly comprising: a pantogtaph link mechanism including a link base supported on a chain stay ahead of a sprocket cluster mounted on a hub shaft, inner and outer link members each extending rearward, and having a base end pivoted by a connecting pin to the link base, and a movable member pivoted by connecting pins to respective free ends of the inner and outer link members; and a chain guide rotatably supporting a guide pulley and a tension pulley, the chain guide being supported on the movable member of the pantograph mechanism to pivot about an axis in parallel with the hub shaft while being elastically urged to tension a chain. For a purpose of securing a pivotal range for the guide pulley without increasing projection of the speed change assembly out of the bicycle width while minimizing the risk for damage to the speed change assembly in case of bicycle rollover, each of the connecting pins is slanted off the vertical for moving the guide pulley inward axially of the hub shaft and forwardly downwardly of the sprocket cluster when the pantograph mechanism is deformed, and each of the inner and outer link members has a top surface, a plane containing at least a portion of the top surface of the inner link member adjacent to the movable member is displaced downward axially of the connecting pins from another plane containing a portion of the top surface of the outer link member adjacent to the movable member.

8 Claims, 7 Drawing Sheets

BICYCLE SPEED CHANGE ASSEMBLY

FIELD OF THE INVENTION

The present invention relates to a bicycle speed change assembly.

BACKGROUND ART

For the convenience of description, reference is now made to the attached FIG. 7. As typically shown in FIG. 7, a prior art bicycle rear derailleur a has a chain guide d which rotatably supports a guide pulley b and a tension pulley c. This chain guide d is supported, via a shift link mechanism such as a parallelogram pantograph mechanism g, on a rear end plate e at an end portion of a bicycle frame, or on a bracket f attached to the rear end plate e so as to pivot about a predetermined axis while being urged in a direction to tension a chain C.

The pantograph mechanism g includes: a link base h supported by the bracket f; inner and outer link members i, j which are pivotally connected at their respective base end portions to the link base h and extended forwardly of the bicycle; and a movable member k which is pivotally connected to each free end portions of the link members i, j. The movable member k rotatably supports the chain guide d.

The chain guide d is elastically urged by a coil spring (not shown in FIGS.) in a direction to tension the chain C, i.e. in a clockwise direction in FIG. 7. This removes slack in the chain C and gives the chain C a predetermined level of tension.

With the above-mentioned arrangement, when the control cable T, which is connected to the pantograph mechanism g, is pulled or released by a control lever (not shown), the pantograph mechanism g deforms to cause the chain guide d, which is supported by the movable member k, to move axially of a hub shaft n, forcing the chain C to move to a selected sprocket m of a sprocket cluster M.

In this type of bicycle rear derailleur, it is desirable for the sake of improved speed change performance that an edge of the guide pulley b and an edge of each sprocket m of the sprocket cluster M should be within appropriate proximity. This is because the guide pulley b is directly responsible for shifting a portion of the chain ahead of the sprocket cluster M from a sprocket presently engaged with the chain to a target sprocket, and if the edge of the guide pulley b is too far away from the edge of the sprocket cluster M, the guide pulley b will have to travel over a long distance for completing a chain shift operation, resulting in a poor derailleur response.

For this purpose, it is desirable to design a speed change assembly to function in such a way that the guide pulley b would maintain a substantially constant distance with each opposing sprocket m of the sprocket cluster M while the guide pulley moves over an entire range of its travel. In other words, the chain guide d should not move in parallel with the hub shaft n, but shoud move substantially in parallel with a line running through an edge of each sprocket m of the sprocket cluster M. Since the rear sprocket cluster M is usually configured in a manner that a sprocket of a greater diameter is placed closer to the hub shaft, it is necessary for the guide pulley b to moved away from the hub shaft n as it moves axially inward of the hub.

In a prior art bicycle derailleur a, the above-described purpose is achieved in the following means:

As shown in FIG. 7, in a prior art bicycle dereilleur a, the link base h is supported below the hub shaft n, and from this link base h, the inner and outer link members i, j are extended forwardly of the bicycle to configure the pantograph mechanism g, in which connecting pins p, q of the inner and outer link members i, j are slanted off the vertical by a predetermined angle, or otherwise, the link base h is supported pivotally about the bracket f. With this arrangement, it is possible to move the guide pulley b in a manner as shown in FIG. 6, that the guide pulley b travels rearwardly downward of the bicycle as it moves axially inward of the hub shaft, so that the distance between the edge of the guide pulley b and the edge of each sprocket m is maintained substantially constant.

There is a problem, however, with this type of prior art arrangement. As shown in FIG. 6, when the pantograph mechanism g deforms, the chain guide d supported on the movable member k approaches the vertical V which runs through the hub shaft, making a travel l of the guide pulley b away from a sprocket m substantially smaller than its actual travel L of the guide pulley b. As a result, it is necessary in the prior art arrangement that as the sprocket's gear ratio increase, a greater slant angle has to be provided for the connecting pins p and q, with greater amount of deformation required of the pantograph g, and greater amount of pull required of the control cable T. All of these pose a problem of increased overall size of the speed change assembly and the speed change lever.

Another problem with the prior art speed change assembly is that the great deformation of the pantograph link mechanism g and the resulting length of the pull of cable T pose a hurdle against improved operatability of the speed change operation.

Further, since the guide pulley b has to travel over a long distance, the slack in the chain C has to be correspondingly great, resulting in a long and heavy weight of the chain C, putting a limit to the weight reduction of a bicycle.

There is still another disadvantage in the prior art speed change assembly. Since the rear derailleur a is located at a laterally outermost position of a bicycle, it is very susceptible to damage in case of a bicycle rollover. Especially on bicycles specifically designed for off-road cycling, popularly known as mountain bikes, the end of the rear derailleur a is apt to catch bush or other obstacles, interfering with the speed change function.

In an attempt to solve these problems the applicant of the present invention proposed, in the Japanese Patent Application No. Hei 3-65539, a bicycle speed change assembly comprising: a pantogtaph link mechanism including a link base supported on a chain stay ahead of a sprocket cluster mounted on a hub shaft, inner and outer links each having a base end pivoted to the link base and extending rearward, and a movable member pivoted to respective free ends of these inner and outer links; a chain guide rotatably supporting a guide pulley and a tension pulley, supported on the movable member of the pantograph mechanism to pivot about a shaft in parallel to the hub shaft while being elastically urged to tension a chain; and a guide pulley travel control means for moving the guide pulley inward axially of the hub shaft and forwardly downward substantially along a radial path of the sprocket cluster when the pantograph mechanism is deformed.

In this particular bicycle speed change assembly, it is possible to move the guide pulley along a path substantially in parallel with a radius of the sprocket cluster, or in other words, the guide pulley will travel substantially in parallel with a generatrix of an imaginative frustum defined by connecting edges of the sprockets on the sprocket cluster. Furthermore, since the guide pulley moves along a generatrix which runs in a forwardly downward direction, the chain's engaging angle with each sprocket is substantially constant.

This means that according to this prior art invention, the travel distance of the guide pulley necessary to move the chain from the smallest sprocket to the largest sprocket is minimized.

Thus, the pivotal movement required of the inner and outer link mambers is smaller than before, making it possible to reduce the size of the speed change assembly. The amount of pull needed for the control cable is also smaller, resulting in remarkably improved efficiency and operatability in the speed change operation, making it possible to reduce the size of the control lever assembly.

Furthermore, it requires a smaller travel distance of the speed change lever, and therefore, it is also possible to miniaturize the speed change lever assembly.

Another advantage is since the speed change assembly is mounted below a chain stay, the speed change assembly is not an outermost component of the bicycle width. This provides less chance for major damage to the speed change assembly in case of a bicycle rollover.

This prior art application discloses, in claim 2 thereof, a guide pulley control means wherein connecting pins for the inner and outer link members of the pantograph mechanism are slanted off the vertical.

When the connecting pins for the inner and outer link members are slanted, it is possible to cause the movable member of the pantograph machanism to move inward axially of the hub shaft and forward longitudinally of the bicycle, and in addition, downward vertically of the bicycle. As a result, it is possible to move the guide pulley inward axially of the hub shaft, and at the same time, downward forwardly along a radial path of the sprocket cluster. In other words, the guide pulley will move substantially along a forwardly downslope generatrix of the frustum defined by connecting the edges of each sprocket on the sprocket cluster. The speed shift performance is thus remarkably improved.

However, when the connecting pins are slanted in the above-mentioned bicycle speed change assembly to build a speed change assembly known a slant pantograph type, there is a problem that an inner side of the inner link member or that of the movable member can interfere with rear wheel spokes.

This is because the speed change assembly is mounted below the bicycle frame ahead of the hub shaft, and hance the pantograph mechanism is located inwardly of the bicycle width. If the connecting pins are slanted in this arrangement, the inner side of the inner link member or that of the movable member is apt to interfere with rear wheel spoke rotational plane. This puts limit to the extent of pantograph deformation, and to a pivoting range of the movable member as it moves inward of the bicycle width. As a result, the moving range of the movable member must be shifted outwardly of the bicycle width.

However, if the moving range of the movable member is shifted outwardly of the bicycle width, the movable member or the outer link member will stick out of the bicycle width when the movable member is moved to a position where the chain engages the smallest sprocket. This is not only disadvantageous in terms of bicycle apperarance but recurrence to the conventional problem that the speed shift assembly is susceptible to damage in case of bicycle rollover.

Therefore, it is a purpose of the present invention to provide a bicycle speed change assembly supported on a chain stay ahead of a sprocket cluster wherein a guide pulley moving area is secured without increasing protrusion of the speed change assembly out of the bicycle width, without increasing risk for damage to the speed change assembly in case of bicycle rollover, and without decreasing appearance of a bicycle.

The present invention provides a bicycle speed change assembly comprising: a pantogtaph link mechanism including a link base supported on a chain stay ahead of a sprocket cluster mounted on a hub shaft, inner and outer link members each extending rearward, and having a base end pivoted by a connecting pin to the link base, and a movable member pivoted by connecting pins to respective free ends of the inner and outer link members; and a chain guide rotatably supporting a guide pulley and a tension pulley, the chain guide being supported on the movable member of the pantograph mechanism to pivot about an axis in parallel with the hub shaft while being elastically urged to tension a chain. The present invention is characterised in the following means:

Each of the connecting pins is slanted off the vertical for moving the guide pulley inward axially of the hub shaft and forwardly downwardly of the sprocket cluster when the pantograph mechanism is deformed, and each of the inner and outer link members have a top surface, a plane containing at least a portion of the top surface of the inner link member adjacent to the movable member is displaced downward axially of the connecting pins from another ploane containing a portion of the top surface of the outer link member adjacent to the movable member.

Other purposes, characteristics and advantages of the present invention will be understood clearly through the description of a preferred embodiment to be described hereinafter by referring to the attached figures.

BRIEF DESCRIPTION OF THE ATTACHED DRAWINGS

BEST MODE FOR CARRYING OUT THE INVENTION

Figure 1:
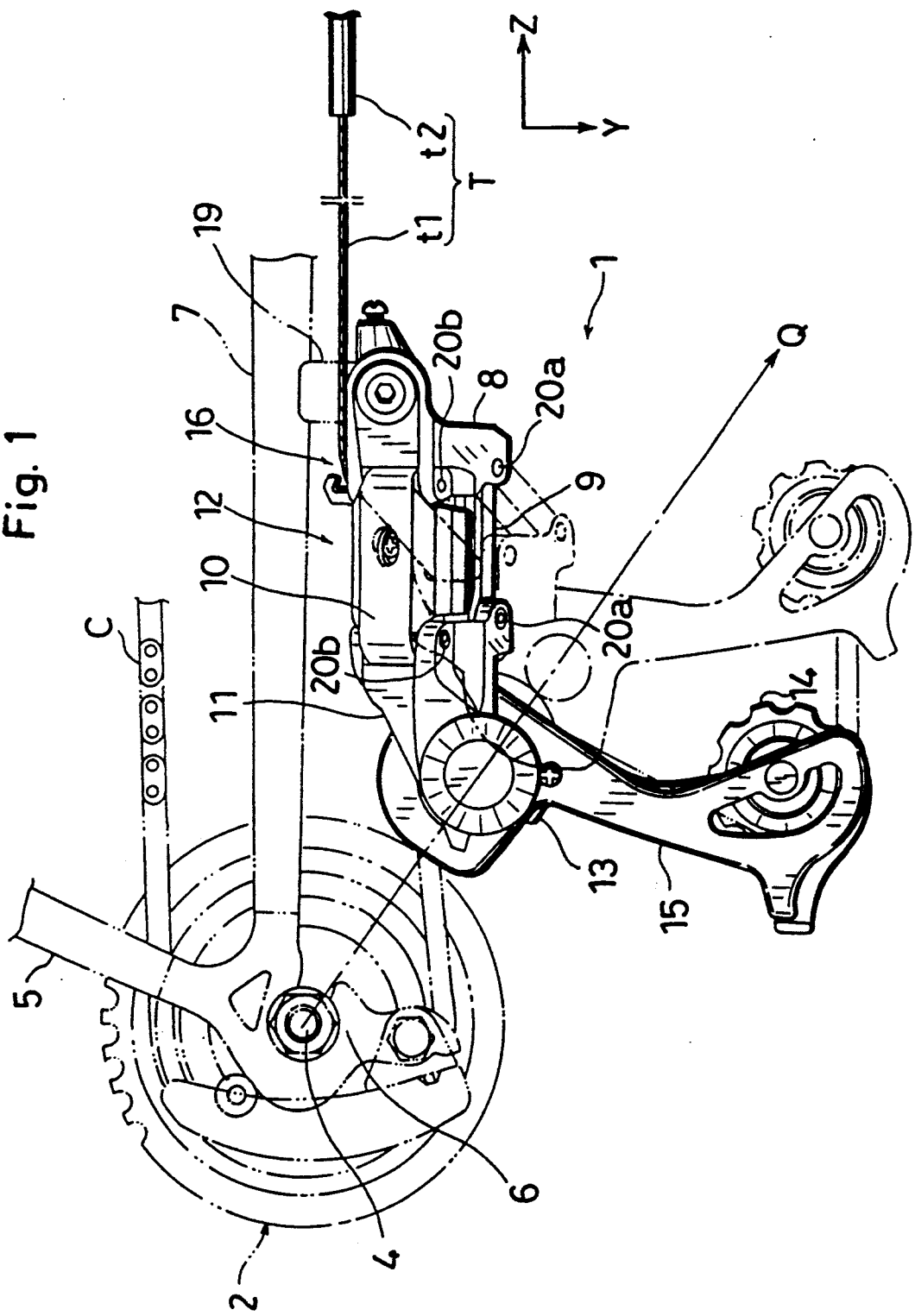
FIG. 1 is a side view of a speed change assembly according to the present invention.
Figure 2:
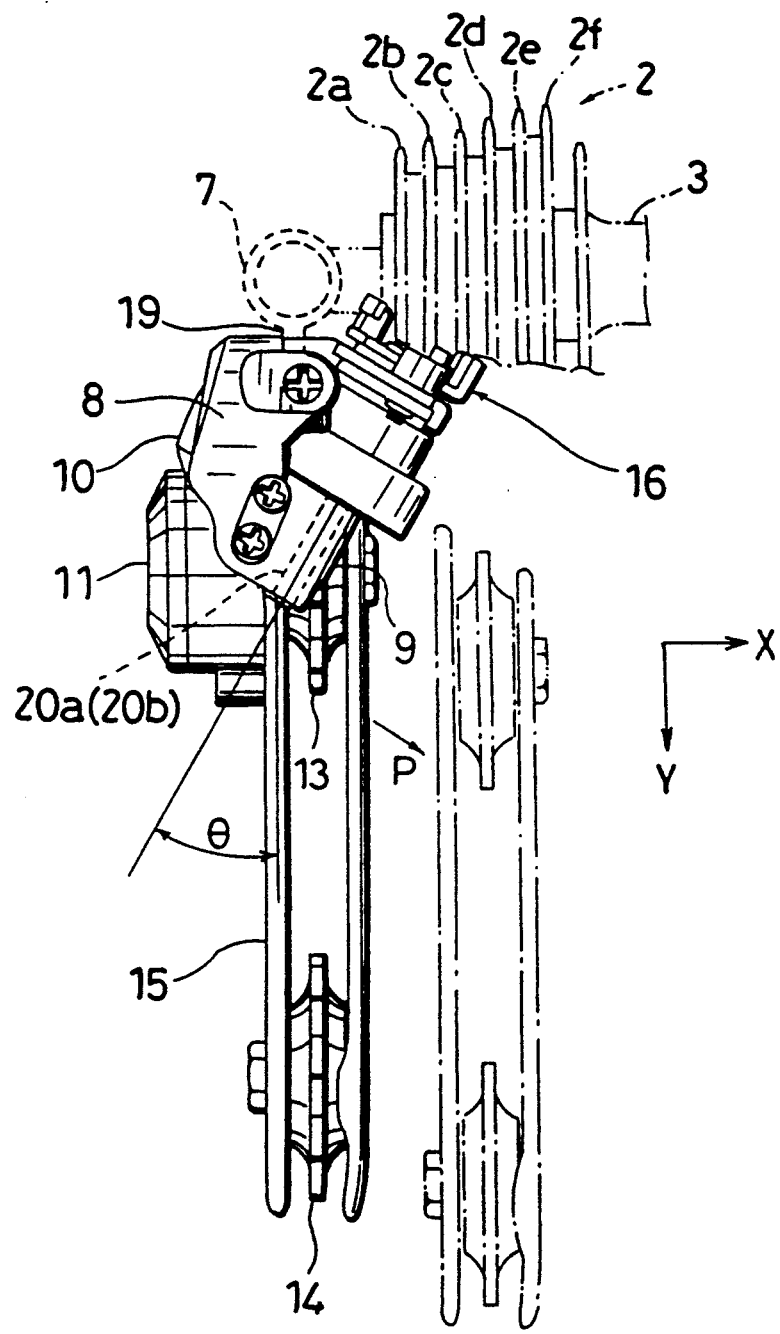
FIG. 2 is a view of the speed change assembly shown in FIG. 1 as viewed from a direction indicated by Arrow II.

FIGS. 1 and 2 show a rear portion of a bicycle to which a speed change assembly 1 according to the present invention is mounted. A hub shaft 4, which rotatably supports a sprocket cluster 2 and a hub 3, is supported by a rear end plate 6 of a bicycle frame 5 in a conventional manner.

The speed change assembly 1 according to the present invention is mounted ahead of the hub shaft 4 or the sprocket cluster 2. The speed change assembly 1 has a pantograph mechanism including: a link base 8 which is supported at an intermediate portion of a chain stay 7 extending forward from the rear end plate 6; an inner link member 9 and an outer link member 10, each having a base end portion pivotally connected to the link base 8; and a movable member 11 which is pivotally connected to each free end portion of the inner and outer link members 9, 10. On the movable member 11, a chain guide 15, which rotatably supports a guide pulley 13 and a tension pulley 14, is rotatably supported while being urged to tension a chain C about an axis in parallel to the hub shaft 4.

Figure 3:
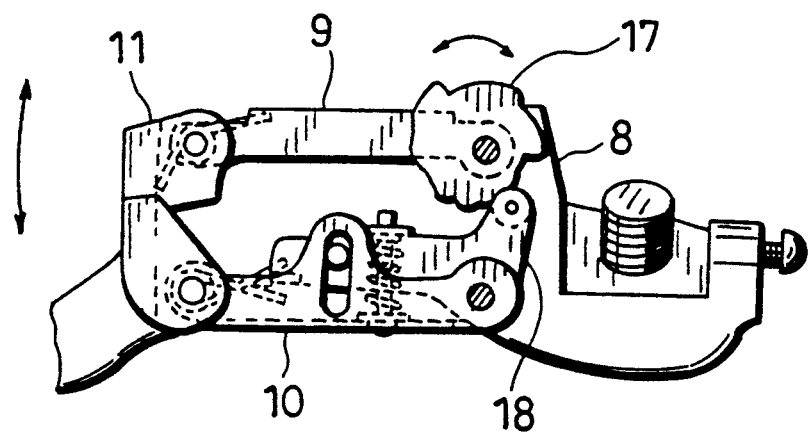
FIG. 3 is a schematic drawing to show function of a pantograph mechanism according to the present invention.

In this embodiment, a control cable T comprises an inner cable t1 and an outer sheath t2. An end of the outer sheath t2 is fastened at a predetermined location on the bicycle frame (not shown in Figs.) whereas the inner cable t1, which extends out of the outer sheath t2, is fastened to a cable connecting means 16 provided above an area where the inner link member 9 is connected to the link base 8. When the inner cable t1 is pulled by a control lever (not shown), the pantograph link mechanism 12 deforms to perform speed change operation. As shown in FIG. 3, the pantograph link mechanism 12 according to the present embodiment is provided with a speed change cam 17 at a base end portion (an end portion closer to the link base) of the inner link member 9. The speed change cam 17 is a cylindrical type, having, as a cam face, a circumference having varied radial distance. The cam face of the speed change cam 17 is contacted by a cam follower 18 mounted on the outer link member 10.

Figure 4:
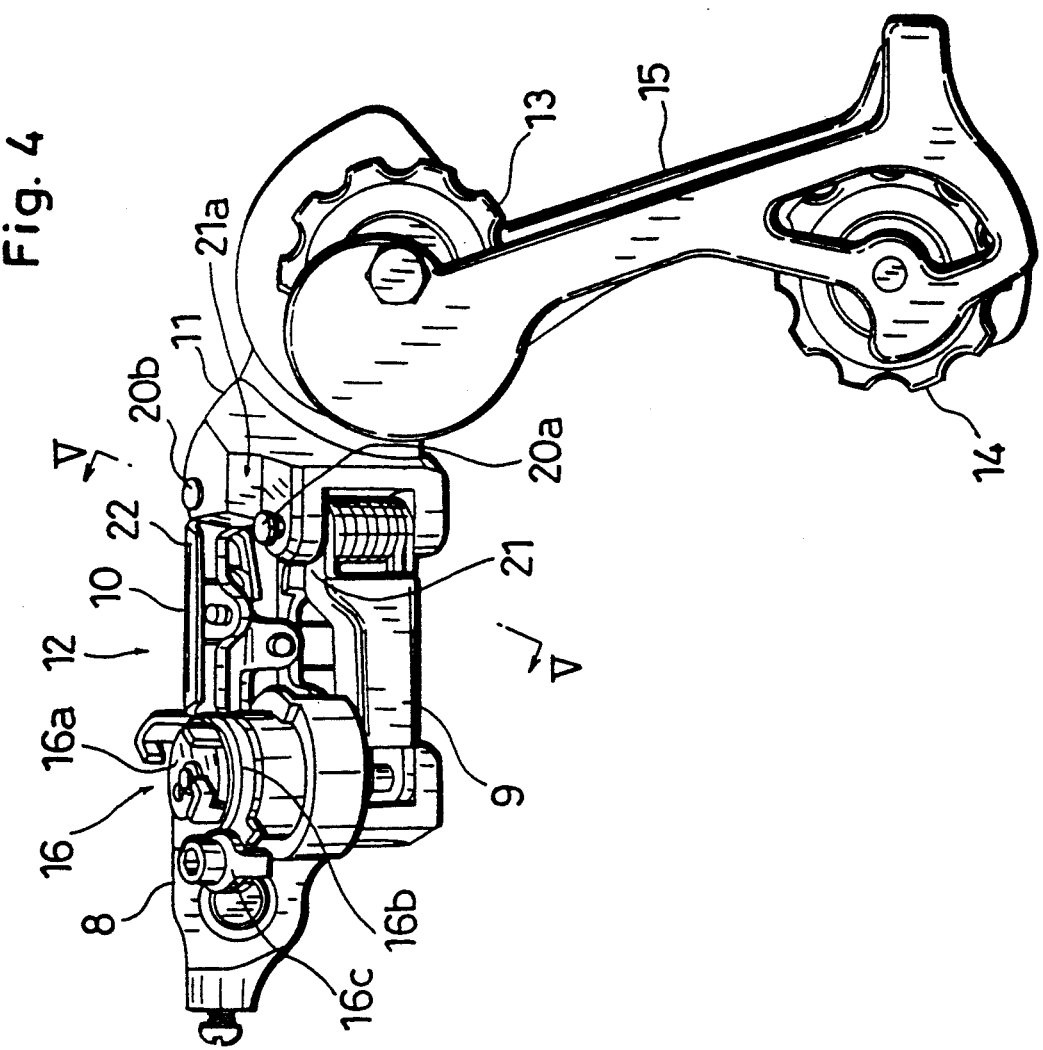
FIG. 4 is a rear view of the speed change assembly shown in FIG. 1.

As shown in FIG. 4, the cable connection means 16 allows an end portion of the inner cable t1, first, to wind around a reel portion 16b formed on an outer wall of the rotating member 16a, and then, to fasten to a fastening means 16c formed on the outer wall of the rotating member 16a. Residual end portion of the inner cable t1 may be wound and held around a rotational shaft on a top surface of the rotating member 16a.

The cable connection means 16 and the speed change cam 17 rotate integrally when pulled by the inner cable t1. When the control cable T is pulled, the speed change cam 17 rotates to change a contact point between the speed change cam 17 and the cam follower 18, thereby deforming the pantograph mechanism 12 laterally.

It should be appreciated to note here that in the present embodiment, the link base 8 is mounted via a bracket 19 which is welded to a predetermined location on the chain stay 7.

In this embodiment, the connecting pins 20a, 20b of the inner and outer link members 9, 10 of the pantograph mechanism 12 are slanted by an appropriate angle $\theta$ off the vertical, as shown in FIG. 2, so that the guide pulley 13 can displace in a predetermined direction.

Hence, by slanting the connecting pins 20a, 20b off the vertical, it is now possible to cause the movable member 11 of the pantograph mechanism 12 to move inward axially of the hub shaft (the direction indicated by Arrow X in FIG. 2,) and at the same time, in a rightwardly downward direction (Arrow P, FIG. 2.)

With the above-mentioned arrangement, when the inner cable t1 of the control cable T is pulled to deform the pantograph mechanism 12, as shown by the phantom lines in FIGS. 1 and 2, the guide pulley 13 moves inward axially of the hub shaft (FIG. 2, Arrow X), and at the same time, forwardly downward along a radial path of the sprocket cluster 2 (FIG. 1, Arrow Q.) In other words, the guide pulley 13 will travel substantially in parallel with a forwardly downslope generatrix of a frustum defined by connecting edges of the clustered sprockets 2a . . . 2f.

Because the guide pulley 13 moves substantially along a forwardly downslope generatrix of the frustum defined by connecting edges of the clustered sprockets 2a . . . 2f, a travel distance of the guide pulley 13 necessary to move the chain C from the smallest sprocket 2a to the largest sprocket 2f will be minimized as shown in FIGS. 1 and 2. Further, since the guide pulley 13 moves along a generatrix of the frustum, the chain's engagement angle with a sprocket will not vary widely from the largest sprocket through the smallest sprocket, even when the sprocket cluster has a substantial diametral difference between the largest and the smallest sprockets, resulting in ensured appropriateness in speed changing operation.

Also, since the travel distance of the guide pulley 13 is minimized, pivotal displacement requied of the inner and outer link members 9, 10 for speed changing operation will be remarkably smaller than has been required in prior art link mechanisms. This makes it possible to reduce the length of the link members 9, 10, enabling to reduce the size of the speed change assembly 1.

Further, since the pivotal displacement requied of the inner and outer link members 9, 10 for speed changing operation is small, it is also possible to reduce the amount of pull and release required of the inner cable t1, resulting in an improved efficiency in the speed change operation.

Furthermore, since the control lever now needs smaller rotational travel, it is also possible to reduce the size of the speed change lever assembly.

There is still another advantage in this embodiment. As shown by the phantom lines in FIG. 1, the guide pulley 13 moves forward (FIG. 1, Arrow Z.) as it moves inward axially of the hub shaft (FIG. 2, Arrow X,) i.e. as it approaches the largest sprocket 2f. This saves the amount of slackness needed in the chain C for securing an appropriate level of tension, and results in a shorter length of the chain C to decrease the overall weight and production cost of the bicycle.

Still another advantage of this embodiment is that, as shown in FIGS. 1 and 2, the speed change assembly 1 will not stick out of the width of the bicycle as has been in a prior art speed change assembly since the speed change assembly 1 is mounted below an intermediate portion of the chain stay 7. This provides less change for major damage to the speed change assembly 1 in case of a bicycle rollover. Also, when the present invention according to this preferred embodiment is mounted to a mountain bike, it provides less chance for the bike to be caught at the speed change assembly portion by bush, tree or other obstacles.

Figure 5:
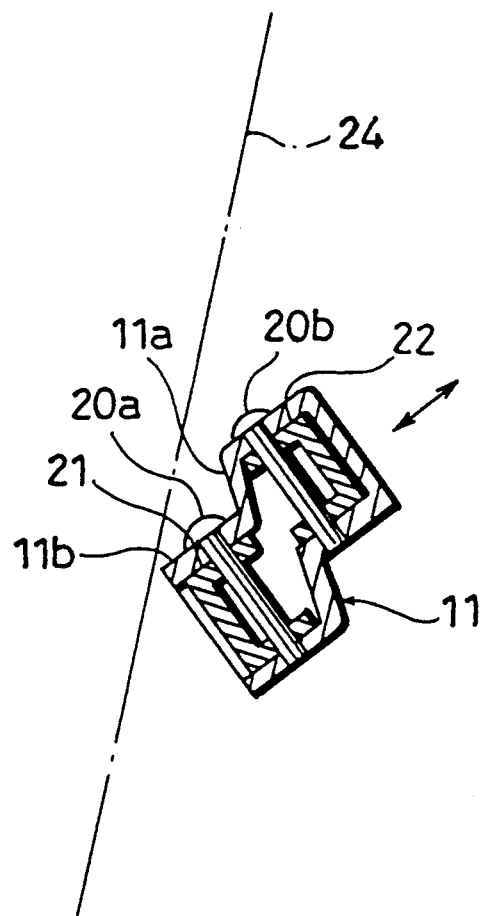
FIG. 5 is a schematic drawing to show function of a speed change assembly according to the present invention.
Figure 6:
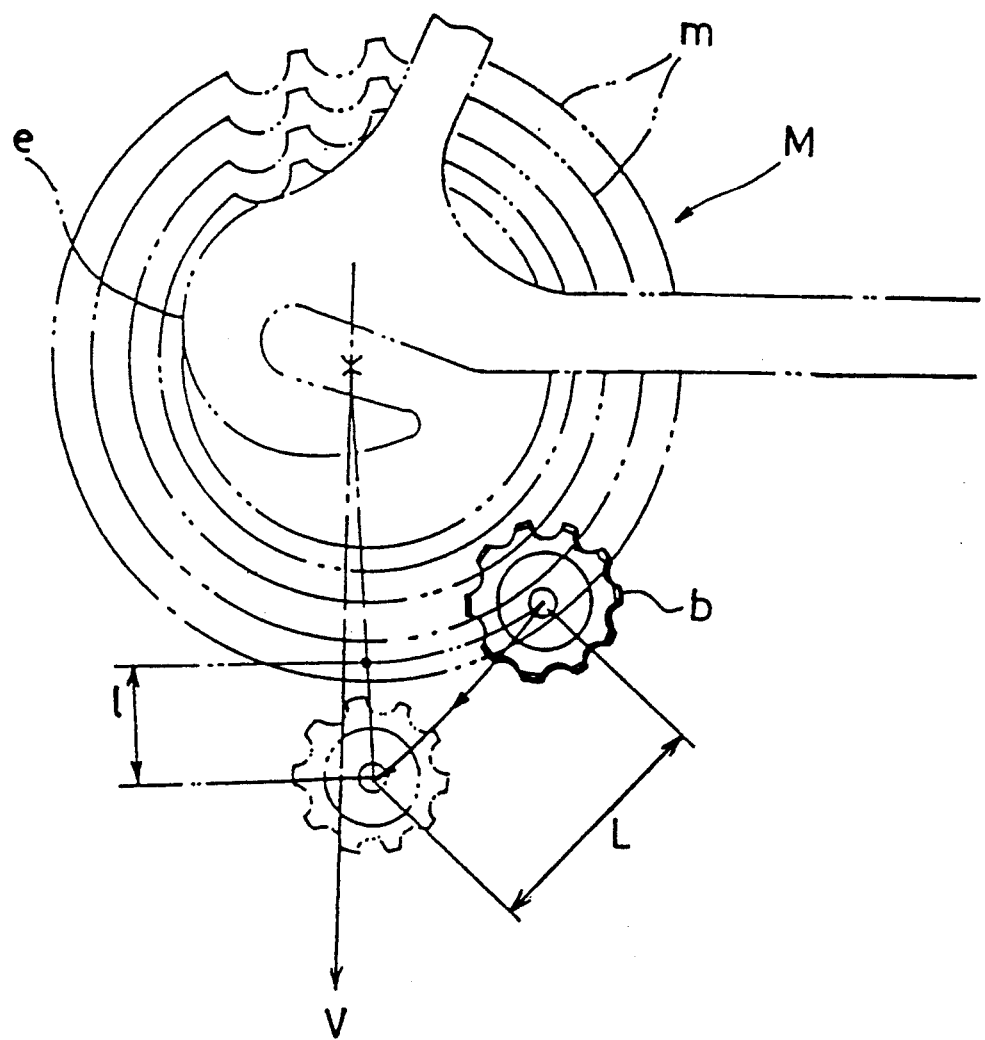
FIG. 6 is a schematic drawing to show function of a conventional speed change assembly.
Figure 7:
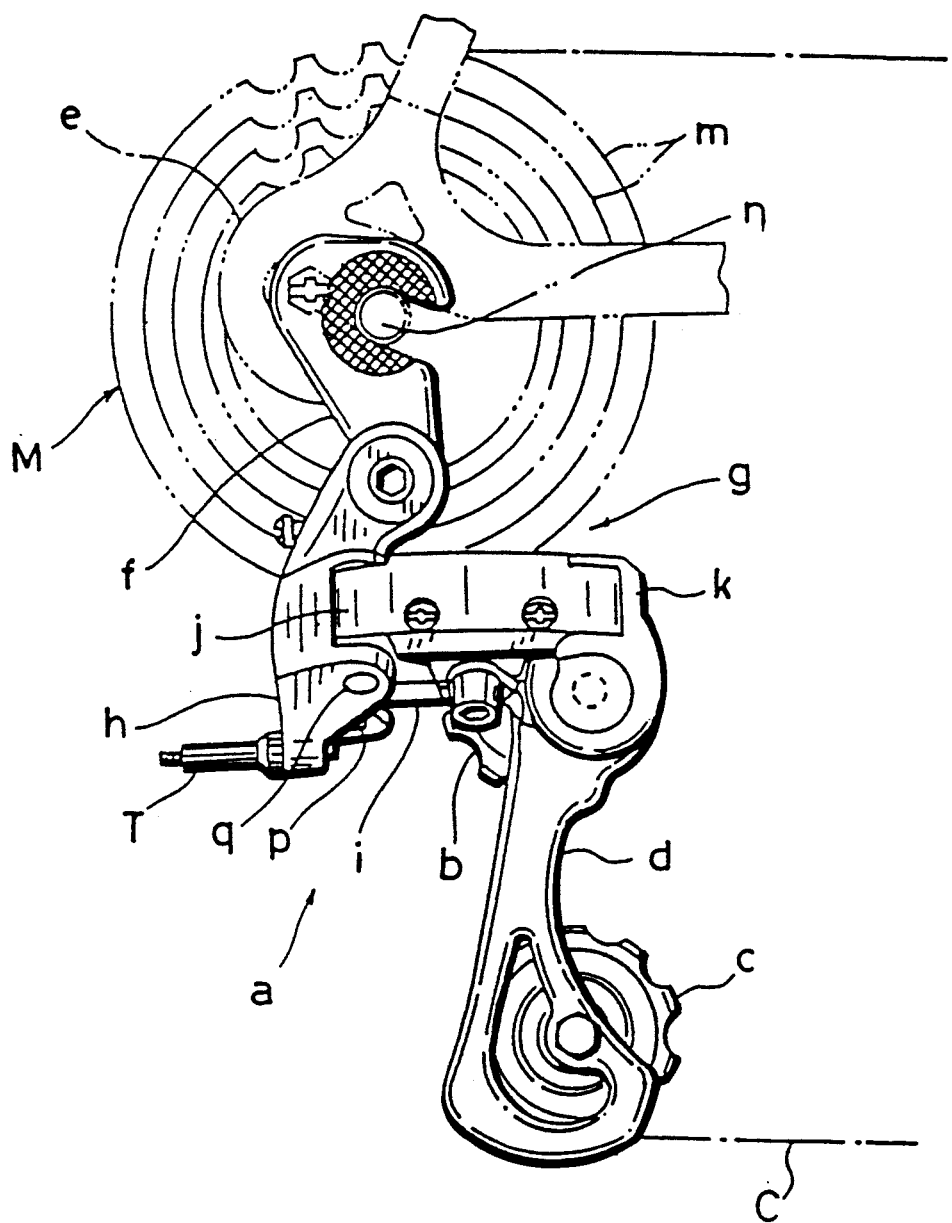
FIG. 7 is a view of a conventional speed change assembly.

Further, as shown in FIGS. 4 and 5, in the present embodiment, a top surface 21 of the inner link member 9 adjacent to the movable member 11 is displaced downward axially of the corresponding connecting pins 20a, 20b from a top surface 22 of the outer link member 10 adjacent to the movable member 11. As a result, pivotal planes of the inner and outer link members 9, 10 are mutually displaced axially of the connecting pins 20a, 20b, with a step portion 21a formed inward of the movable member as shown in FIGS. 4 and 5.

This arrangement prevents the inner top surfaces 21, 11b respectively of the inner link member 9 and movable member 11 from running into a rotational plane 24 of rear wheel spokes. As a result, the movable member 11 may be moved more inwardly than has been possible in prior art.

Accordingly, the speed change assembly may be mounted inwardly of the bicycle width, while the movable member 11 may move further inwardly. This allows the speed change assembly to be used for a hub having a large number of sprockets.

Likewise, since the chain guide can stay at a more inward location than before when it moves the chain to the outermost sprocket, the speed change assembly sticks less out of the bicycle width.

This further reduces the risk for damage to the speed change assembly in case of a bicycle rollover. Aerodynamic characteristics of the bicycle may also improve.

In addition, as has been mentioned hereinabove, the inner link member 9 and the outer link member 10 are axially displaced to each other in the pantograph mechanism. This has the same effect as that the length of the connecting pins 20a, 20b, which pivotally support the inner and the outer link members respectively, is increased. This may significantly reduce unwanted play in the pantograph mechanism 12 when it pivots.

The present invention being thus far described, the scope of the present invention should not be limited to those already discussed in the embodiment hereinabove, and it should be noted that there are many ways for variation.

For instance, it is not necessary to use the speed change cam 17 provided at an end portion of the inner link member 9 closer to the link base and the cam follower 18 contacted to the speed change cam 17 for causing the pantograph mechanism 12 to deform laterally. Instead, the control cable may be connected directly to a portion of one of the link members which constitute the pantograph mechanism.

In the embodiment, the present invention is applied to a speed change assembly 1 which has a pendulum type chain guide 15 wherein the chain guide and the guide pully share the same pivotal axis. However, the present invention may also be applied to a triangle type speed change assembly wherein the chain guide is pivoted around an axis provided at an intermediate portion between the guide pulley and the tension pulley.

I claim:

1. A bicycle speed change assembly comprising:
    a pantograph link mechanism including a link base supported on a chain stay ahead of a sprocket cluster mounted on a hub shaft, inner and outer link members each extending rearward, and having a base end pivoted by a connecting pin to the link base, and a movable member pivoted by connecting pins to respective free ends of the inner and outer link members; and
    a chain guide rotatably supporting a guide pulley and a tension pulley, the chain guide being supported on the movable member of the pantograph mechanism to pivot about an axis in parallel with the hub shaft while being elastically urged to tension a chain: wherein
    each of the connecting pins is slanted off the vertical for moving the guide pulley inward axially of the hub shaft and forwardly downwardly of the sprocket cluster when the pantograph mechanism is deformed, and
    each of the inner and outer link members has a top surface, a plane containing at least a portion of the top surface of the inner link member adjacent to the movable member is displaced downward axially of the connecting pins from another plane containing a portion of the top surface of the outer link member adjacent to the movable member.

2. A bicylce speed change assembly according to claim 1 comprising:
    a pantogtaph link mechanism including a link base supported on a chain stay ahead of a sprocket cluster mounted on a hub shaft, inner and outer link members each extending rearward, and having a base end pivoted by a connecting pin to the link base, and a movable member pivoted by connecting pins to respective free ends of the inner and outer link members; and
    a chain guide rotatably supporting a guide pulley and a tension pulley, the chain guide being supported on the movable member of the pantograph mechanism to pivot about an axis in parallel with the hub shaft while being elastically urged to tension a chain: wherein
    each of the connecting pins is slanted off the vertical for moving the guide pulley inward axially of the hub shaft and forwardly downwardly of the sprocket cluster when the pantograph mechanism is deformed, and
    a pivotal plane of the inner link member is displaced downward axially of the connecting pins from a pivotal plane of the outer link member.

3. The bicycle speed change assembly according to claim 1, wherein the inner link member has a top surface which is stepped so that a plane containing a portion of the top surface of the movable member adjacent to the inner link member is displaced downward axially of the connecting pins from another plane containing another portion of the top surface of the movable member adjacent to the outer link member.

4. The bicycle speed change assembly according to claim 1, wherein the chain guide is of a pendulum type.

5. The bicycle speed change assembly according to claim 1, wherein the chain guide is of a triangle balance type.

6. The bicycle speed change assembly according to claim 1, wherein the pantograph mechanism is provided with a generally cylindrical speed change cam mounted to a link base end portion of the inner link member, and a cam follower contacting the cam for deforming the pantograph mechanism laterally of the bicycle.

7. The bicycle speed change assembly according to claim 6, wherein the speed change cam is provided with a cable connecting means connected to an end portion of a control cable for rotating the speed change cam.

8. The bicycle speed change assembly according to claim 1, wherein a control cable is connected directly to one of the link members for causing the pnatograph mechanism to deform laterally of the bicycle.

* * * * *